United States Patent
Means

[15] 3,660,758
[45] May 2, 1972

[54] DEVICE FOR TESTING SEMICONDUCTORS

[72] Inventor: James A. Means, 2090 Suner Circle, Camarillo, Calif. 93010

[22] Filed: July 23, 1970

[21] Appl. No.: 57,599

[52] U.S. Cl..........................................324/158 T
[51] Int. Cl........................................G01r 31/22
[58] Field of Search.....................324/158 T, 158, 158 D

[56] References Cited

UNITED STATES PATENTS

| | | | |
|---|---|---|---|
| 2,776,420 | 1/1957 | Woll | 324/158 T UX |
| 2,895,106 | 7/1959 | Taunt | 324/158 |
| 3,458,814 | 7/1969 | Ryan | 324/158 |
| 3,478,264 | 11/1969 | Tsergas | 324/158 X |

Primary Examiner—Herman Karl Saalbach
Assistant Examiner—Marvin Nussbaum
Attorney—Richard S. Sciascia, Q. Baxter Warner and Howard J. Murray, Jr.

[57] ABSTRACT

A small, compact device for quickly and easily testing semiconductors to ascertain whether they are usable or whether they are faulty because of a short or open circuit. Each condition is represented by the status of an indicator lamp, when testing bipolar transistors - (1) a flashing light indicates a good component, (2) a steady on light a shorted transistor ro excessive leakage current, and (3) a steady off light, an open component or unusually low current gain.

6 Claims, 2 Drawing Figures

PATENTED MAY 2 1972

3,660,758

JAMES A. MEANS
INVENTOR

BY Howard J. Murray Jr. AGENT
P. Baxter Adams
ATTORNEY

3,660,758

DEVICE FOR TESTING SEMICONDUCTORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Semiconductors such as diodes and transistors are in widespread use as components in electrical equipment. It is imperative that some means for checking these devices be available to preclude the installation of a faulty element which could be difficult to locate once the assembly has been completed, and to assist in locating faulty components after assembly. A common practice is to employ an ohmmeter for this purpose, but this expedient is not completely satisfactory since it fails to simulate actual operating conditions. Furthermore, an ohmmeter alone cannot determine whether or not a transistor possesses any current gain. Another practice is to utilize complex curve tracers, but the size and cost of such equipment renders such use impracticable in many instances.

SUMMARY OF THE INVENTION

The present concept is directed to the provision of a small, compact test set capable of categorizing semi-conductors as GOOD, SHORTED, or OPEN devices. A rapid check is available through the status of an indicator lamp - when checking transistors, a flashing lamp signifies a good device that is being driven alternately between saturation and cutoff, a steady-on lamp indicates a shorted device, and an off lamp indicates the presence of an open circuit. When checking diodes, a good component causes the lamp to light in one position of a switch and be off in another position. An off light in both positions indicates an open diode, while a lighted lamp in both switch positions signifies an internal short.

STATEMENT OF THE OBJECTS OF THE INVENTION

One object of the invention, therefore, is to provide a compact, self-contained testing device for semiconductors which permits a quick evaluation of their operating status.

A further object of the invention is to provide a semiconductor test set which will yield a visual indication of the condition of the component under test.

Another object of the invention is to provide a self-contained transistor test set which is not only of small physical size but is light in weight and subject to very low current drain and hence long battery life.

Another object of the invention is to provide a test set which checks the operation of a bipolar transistor in its three areas of operation; that is, active, saturation, and cutoff regions.

A still further object of the invention is to provide a test set capable of testing many different types of transistors and diodes having a wide diversity of characteristics and configurations.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
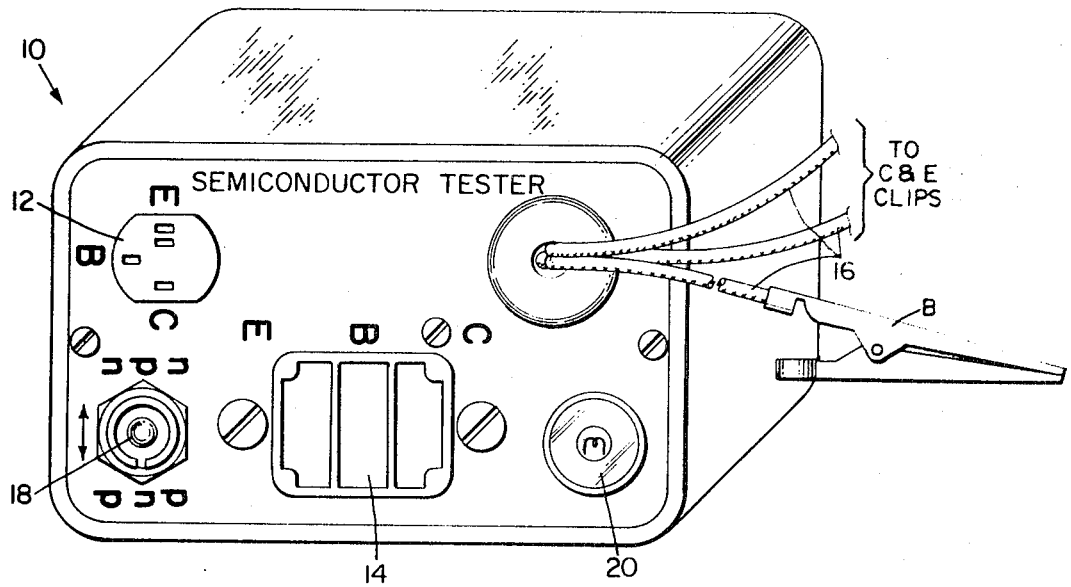
FIG. 1 is a perspective view of a transistor test set designed in accordance with a preferred embodiment of the present invention.

Referring now to the drawings, there is shown in FIG. 1 a perspective view of one semiconductor test set which has been constructed in accordance with the principles of the present invention. This test set, generally identified in the drawing by the reference numeral 10, weighs less than one pound and is only 2 inches × 2 inches × 3 inches in overall dimensions. It can thus be held in the palm of one hand and is easily transportable. It generates no heat and is capable of utilization in relatively inaccessible locations where heavier and more cumbersome equipment can not be taken.

The unit 10 is entirely self-contained, including a battery serving as the power supply. Before describing the electrical circuitry of the test set, it might be noted from FIG. 1 of the drawings that the unit is adapted for testing transistors of either the NPN or PNP type, having emitter (E), collector (C) and base (B) electrodes. Since transistor design varies, provision is made for accepting all commercial types. This takes the form of two connectors or sockets 12 and 14 and a set of clip leads 16, all of these alternative adapters being arranged electrically in parallel for alternative use. A switch 18 having PNP and NPN positions allows for testing of either type component. The status of the element being tested is visually indicated by the illumination of a lamp 20.

Figure 2:
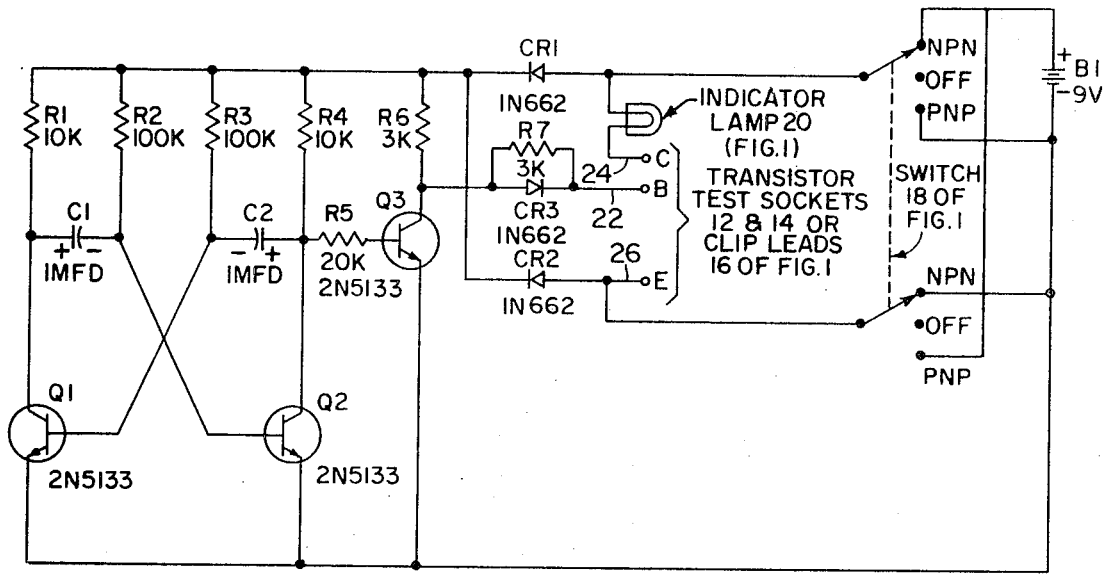
FIG. 2 is a schematic circuit diagram of the test set of FIG. 1.

The electrical make-up of the test set 10 is illustrated in FIG. 2 of the drawings. Transistors Q1 and Q2, with capacitors C1 and C2 and resistors R1, R2, R3 and R4 constitute a conventional astable (free-running) multivibrator operating at about four cycles per second with the component values shown. The output of the multivibrator is a square wave, which is applied through R5 to the driver transistor Q3, switching that transistor between saturation and cutoff.

The square wave output of transistor Q3 is applied to the base terminal 22 of the transistor under test, as brought out in the drawing. The indicator lamp 20 is connected in series with the collector terminal 24 of the transistor under test to yield a visual indication of collector current, which is being alternately switched between saturation current and leakage current for a good device under test.

The switch 18 reverses the polarity of the voltage applied to the transistor under test for battery B1. The collector lead 24 will be positive when switch 18 is in the NPN position, and negative when switch 18 is in the PNP position. Potentials of opposite polarity are applied to the emitter lead 26.

Diodes $CR_1$ and $CR_2$ provide the proper polarity of voltage to the transistors $Q_1$ and $Q_2$ of the multivibrator and also to transistor $Q_3$, regardless of the position of switch 18.

The base drive current available for a PNP transistor under test is limited to less than 3 milliamps in the example described by the action of resistor $R_7$. A diode $CR_3$ by-passes $R_7$ to ensure that approximately the same base drive current is also available when testing an NPN transistor.

When using the test set 10, the leads of a transistor to be checked are inserted in either of the connectors 12 or 14 of FIG. 1, or, alternatively, the clips 16 are employed. If the latter are not utilized, care should be taken to ensure that these clips are not electrically in contact with one another. The component to be checked is, of course, connected to the proper E, C and B terminals of the test set.

The switch 18 is then actuated to the correct position for the type of transistor under test, and held in such position. The lamp 20 will now indicate the condition of this component, as follows:

Flashing lamp = transistor good
Steady-on lamp = transistor shorted (or excessive leakage)
Steady-off lamp = open (or extremely low current gain)

Since the transistor being tested is thus checked in all three conditions of operation - (1) active, (2) cutoff and (3) saturation - the evaluation is far superior to one where only tests of each p-n junction are available, as with a standard ohmmeter.

When a diode is to be tested, such element is connected between the C and E terminals of the invention device, with the polarity of this connection being unimportant. The switch 18 is actuated to one position and the lamp 20 observed. The switch 18 is then actuated to the other position. The following results are possible:

(1). Lamp 20 lighted one way and dark the other = diode good (2) Lamp 20 lighted both ways = diode shorted (3) Lamp 20 dark both ways–diode open One alternative use for the test set 10 is that of a source of square waves. A wave train at about 4 c.p.s. is available from the B and E terminals when switch 18 is in either NPN or PNP position. In the former, the square wave at terminal 22 is positive-going and about 7 volts (no load) with a 3K output impedance. In the PNP position, the output wave is identical except that it is negative-going.

Another alternative use for the test set 10 is that of a continuity-checker. When the C and E leads are connected to a circuit to be tested, the lamp 20 will be lighted (steady-on) for electrical continuity and not lighted otherwise. It should be noted, however, that this test is valid only for resistance values of less than approximately 100 ohms.

While lamp 20 is preferred as the means for indicating the condition of a component under test, it is obvious that an audible signal (such as from a buzzer) may be substituted for the visual indicator if such is desired.

Obviously many modifications and variations of the present invention are possible in the light of the above teachings. It is therefore to be understood that within the scope of the appended claims the invention may be practiced otherwise than as specifically described.

I claim:

1. A device for testing a semiconductor to ascertain whether it is usable or whether it is faulty because of a short or open circuit, said device comprising:
   a multivibrator;
   a transistor periodically driven between saturation and cutoff by the output of said multivibrator;
   means for applying the varying output of said transistor to the base electrode of the semiconductor under test;
   a source of potential connected between the collector and emitter electrodes of the semiconductor under test; and
   an indicating device connected in series between the semiconductor collector electrode and said potential source;
   whereby periodic energization of said indicating device denotes a periodic flow of collector current from said semiconductor and hence demonstrates that such component is usable.

2. The device of claim 1, wherein a constant energization of said indicating device denotes a constant flow of collector current from said semiconductor and hence demonstrates that such component is not usable because of an internal short.

3. The device of claim 1, wherein a failure of said indicating device to be energized denotes a failure of collector current to flow from said semiconductor and hence demonstrates that such component is not usable because of an internal open circuit.

4. A device according to claim 1, further comprising a switch for selectively reversing the polarity of the voltage applied from said source to the collector and emitter electrodes of the semiconductor under test depending upon whether the latter is of the n-p-n or p-n-p type.

5. The combination of claim 1 in which said indicating device is a lamp designed to be periodically illuminated when a usable semiconductor is under test.

6. A device for testing a semiconductor to ascertain whether it is usable or whether it is faulty because of a short or open circuit, said device comprising:
   means for generating a unipolarity square wave potential;
   means for applying said unipolarity square wave potential to the semiconductor to be tested;
   means for yielding an indication as to whether the semiconductor to which the said unipolarity square wave potential is applied is usable or faulty;
   the said indicating means being periodically energized to denote a usable semiconductor and constantly energized to denote a semiconductor which is not usable because of an internal short;
   the said indicating means remaining deenergized to denote a semiconductor which is not usable because of an internal open circuit.

* * * * *